United States Patent
Penrith

(10) Patent No.: US 7,318,329 B2
(45) Date of Patent: Jan. 15, 2008

(54) METHOD OF MAKING A CONTAINER FROM A BOTTLE

(75) Inventor: Sean C. Penrith, Wausau, WI (US)

(73) Assignee: Cavu Glass, LLC., Weston, WI (US)

( * ) Notice: Subject to any disclaimer, the term of this patent is extended or adjusted under 35 U.S.C. 154(b) by 300 days.

(21) Appl. No.: 10/509,883

(22) PCT Filed: Apr. 4, 2003

(86) PCT No.: PCT/US03/10298

§ 371 (c)(1),
(2), (4) Date: Apr. 22, 2005

(87) PCT Pub. No.: WO03/084887

PCT Pub. Date: Oct. 16, 2003

(65) Prior Publication Data

US 2006/0174654 A1    Aug. 10, 2006

Related U.S. Application Data

(60) Provisional application No. 60/369,605, filed on Apr. 4, 2002.

(51) Int. Cl.
A47B 9/00 (2006.01)
(52) U.S. Cl. ............................. 65/108; 65/112; 65/36; 65/56

(58) Field of Classification Search ................. 65/112; D7/509
See application file for complete search history.

(56) References Cited

U.S. PATENT DOCUMENTS 2,001,436 A * 5/1935 Schutz ........................ 65/279
D284,631 S * 7/1986 Inns ............................ D7/525
5,817,162 A   10/1998 Penrith
6,055,829 A   5/2000 Witzmann et al.

OTHER PUBLICATIONS

Bottle Cutting, Article Mar. 18, 2002 [Online], [Retrieved May 28, 2003]. Retrieved from iamanangelchaser.com.
Penrith, Sean C., The new 'Flare'style goblet . . . , Article Aug. 12, 2002 [Online], retrieved on May 23, 2003, retrieved from greenglass.com.

* cited by examiner

Primary Examiner—Steven P. Griffin
Assistant Examiner—Phu H Nguyen
(74) Attorney, Agent, or Firm—Berenato, White & Stavish

(57) ABSTRACT

A bottle is separated along at least one or two severance planes and the base of the bottle is discarded leaving the body portion behind. The body portion having a rim (10) is inverted to form the bowl of the goblet. Under heat and rotation, the original mouth (20) is flared to form a foot and the neck portion (30) is twisted or otherwise closed to seal the goblet from leakage.

9 Claims, 3 Drawing Sheets

METHOD OF MAKING A CONTAINER FROM A BOTTLE

This application is a 371 of PCT/US03/10298 filed Apr. 4, 2003 which claims benefit of 60/369,605 filed Apr. 4, 2002.

BACKGROUND OF THE INVENTION

This invention relates to a method of making a container from a bottle, and in particular to a method of forming a goblet from a glass bottle of the type having a base, a cylindrical body portion extending from the base and converging towards a neck which terminates in a mouth.

Most glass bottles are non-returnable, in that they do not attract a deposit after they have been used. As a result, they create a significant pollution problem, which is exacerbated by the fact that most discarded bottles are eventually broken so as to form hazardous shards of glass.

With the recent increase in environmental awareness, recycling of non-returnable bottles is taking place. Most of these bottles are not used in their existing form, but are melted down, with the resultant amalgam of relatively low quality glass only having limited uses. Furthermore, considerable energy is involved in the recycling process, which involves melting the glass and removing various impurities.

SUMMARY OF THE INVENTION

Typically, bottles for use in this invention are sourced from recyclers or local markets. The bottles are then washed and sterilized.

With the method of this invention, a bottle is separated along at least one or two severance planes and the 'base' of the bottle is discarded leaving the body portion behind. The body portion is inverted to form the bowl of the goblet. The neck portion is twisted or otherwise closed to seal the goblet from leakage, and the original mouth is flared to form a foot.

It is noted that sometimes the discarded base portion is more in the style of an unfinished tumbler versus just the base, but this depends on the severance plain position and dimensions of the bottle. See, for example, the base portion 40 shown in FIG. 1.

Figure 1:
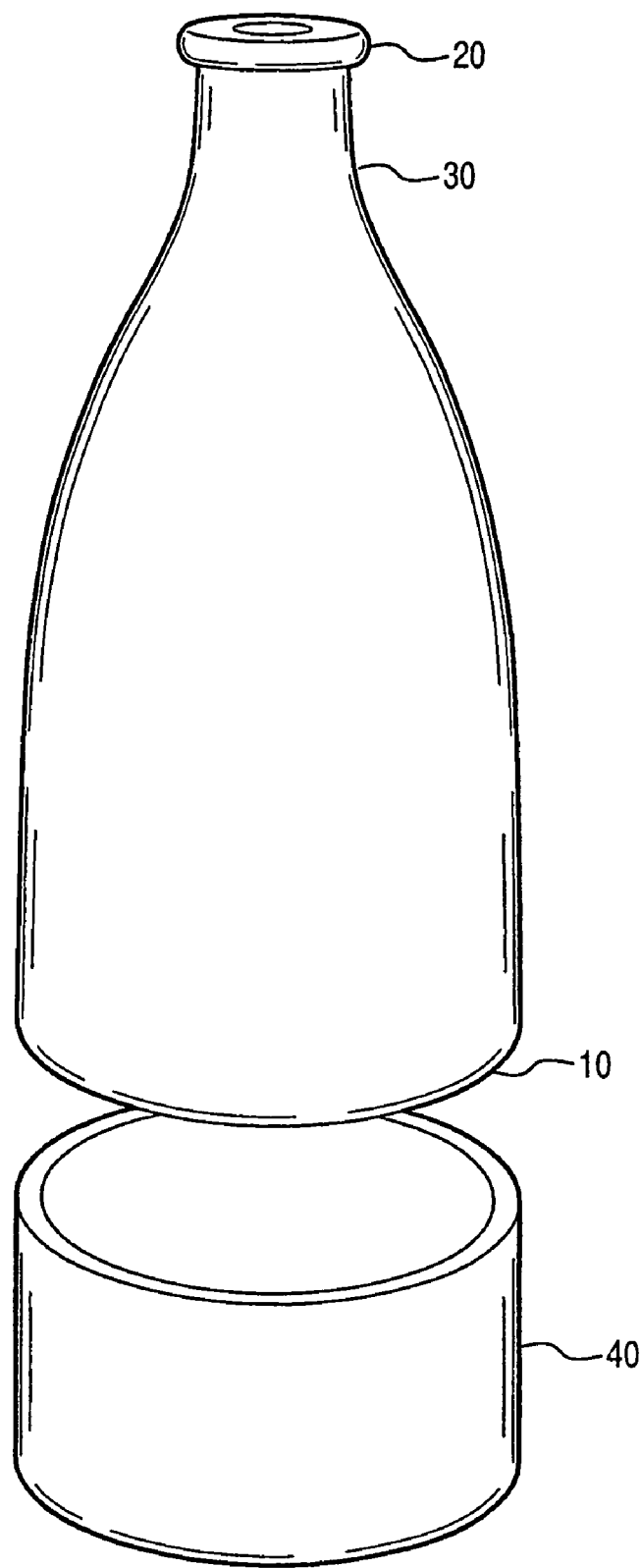
FIG. 1 is a schematic perspective view of a bottle exemplifying the method of this invention with the bottom removed.
Figure 3:
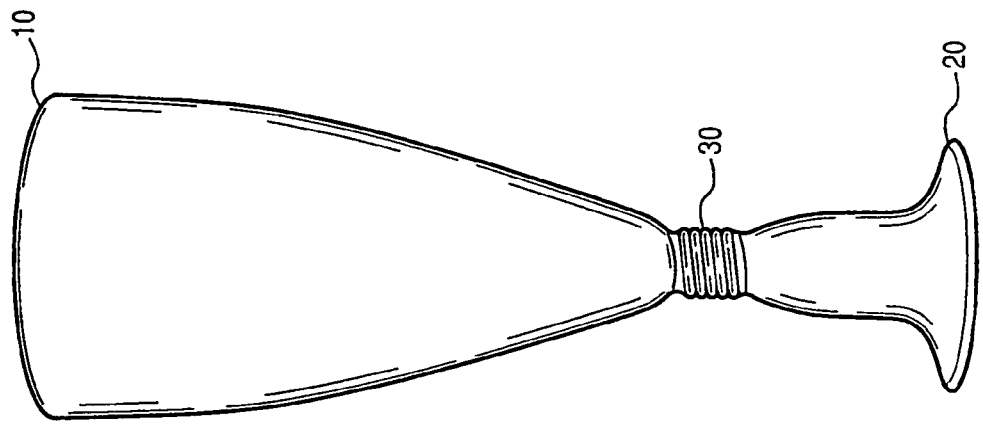
FIG. 3 is an example of a bottle formed by the method of the instant invention.
Figure 2:
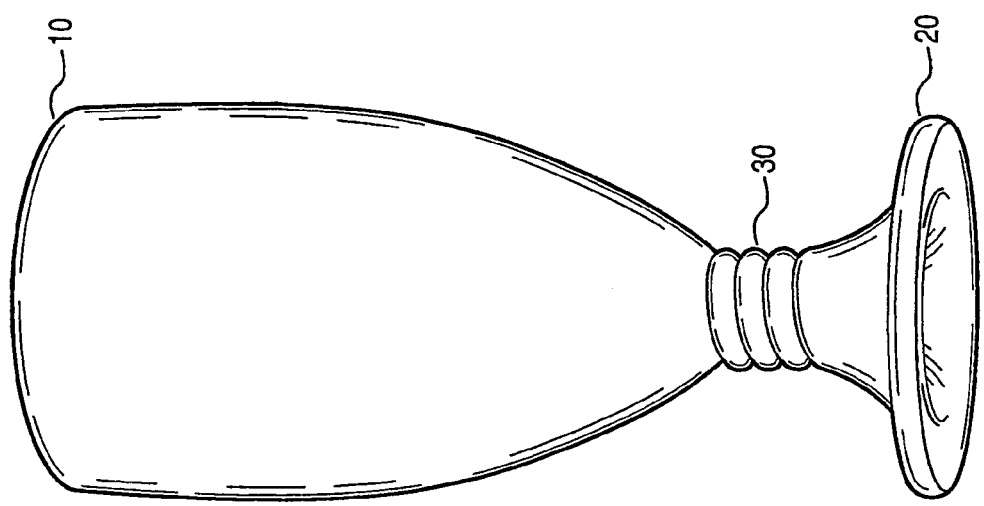
FIG. 2 is a schematic perspective view of a bottle after the mouth has been flared and the neck has been twisted.
Figure 4:
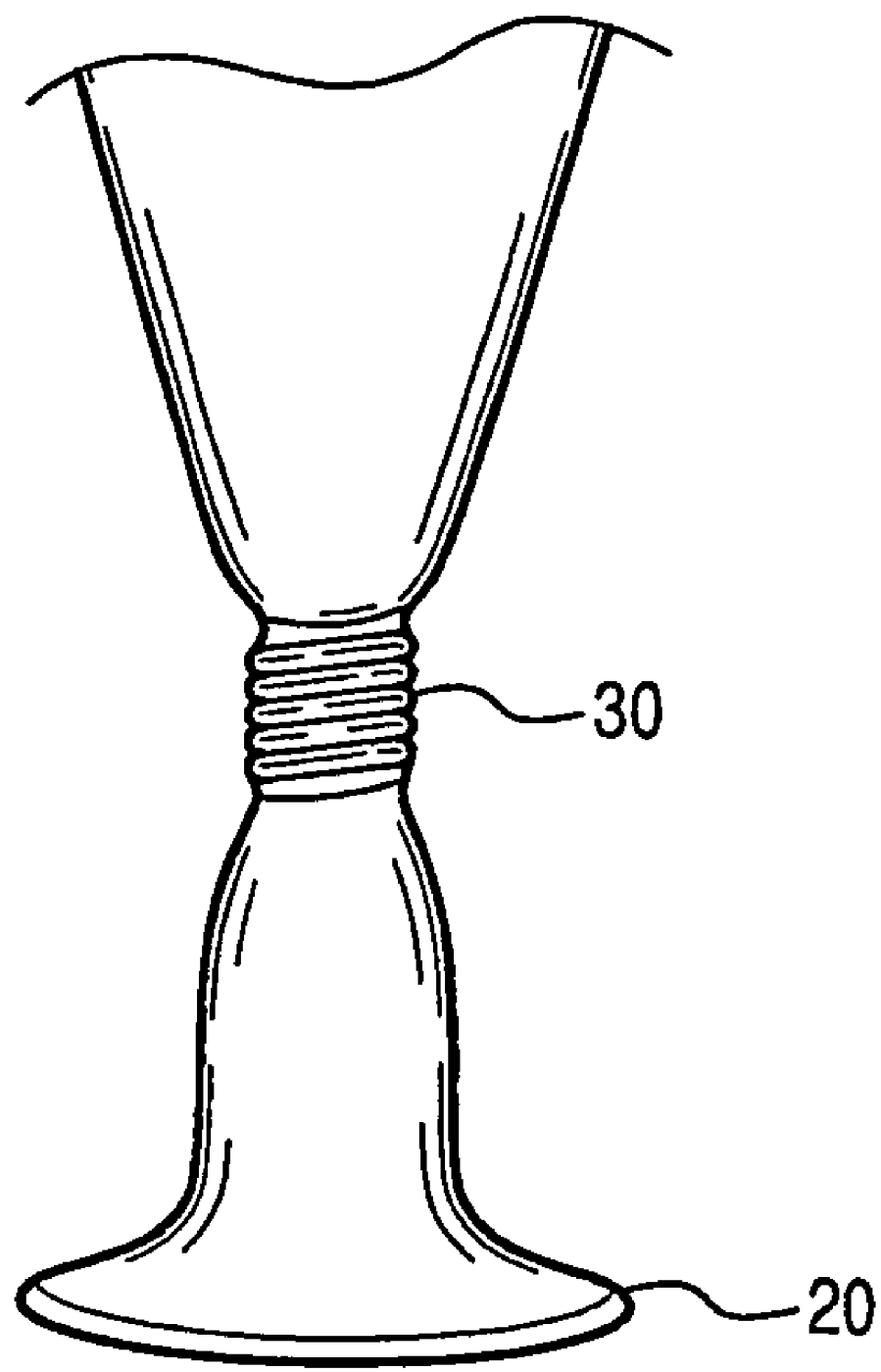
FIG. 4 is an enlarged view showing the neck and mouth forming the foot portion of a goblet made by the method of this invention

With reference to attached FIG. 1, a bottle 1 is separated along at least one severance plane and the base 40 of the bottle is discarded or otherwise used as a tumbler 40; thereby, leaving the body portion behind. The rim 10 is finished smoothed and fire-polished (e.g., ground, beveled and heat polished) or treated in other known methods to create a safe edge. Next, the mouth 20 is heated while the whole body portion is spun. When the mouth 20 reaches its fiber softening point, it begins (under centrifugal force) to flare outwards as it is spun. This process (heat and spin) is continued until the mouth 20 has spun far out enough to serves as a proper foot of the resulting goblet. The heat is then removed from the mouth portion and concentrated now on the neck portion 30 while the unit is still spinning. The neck 30 too reaches its fiber softening point, the spin cycle is slowed and the newly formed foot is allowed to rest on a base (flat surface). A profiled rod of graphite or other non-glass-bonding frictionless medium is inserted from below and made to press up inside the base. With the foot resting on the flat surface the neck 30 is caused to slowly twist and wind up, by force of friction, thereby closing off the neck 30. The graphite rod prevents the collapse of the heated neck onto the foot. On occasion, one may wish to c draw the heated neck 30 out to alleviate stress and to create an hourglass shape in the neck. In this instance, additional heat may be applied to the twisted neck 30 to cause the foot to drop a little. The graphite-profiled rod maintains its position and contact with the interior of the foot so as to prevent collapse of the neck onto the foot while 'drawing' of the neck occurs.

Heat is removed. The newly formed goblet then travels through an annealing (tempering) oven to remove all residual stress in the glass.

It is noted that the neck can either be closed off completely through twisting or a small aperture may remain that is sealed using low-fire (solder-glass) glass which is dropped into the bowl of the newly formed goblet and melts in the aperture thereby closing the neck off completely. This aperture may also be sealed using a non-toxic (UV curable) adhesive.

Further, the length, thickness and character of the drawn neck and can vary from glass to glass.

Next, the glass can then be left as is (clear) or decorated with various designs using a sandblasting or etch process.

Each step of the manufacturing process will now be described.

Regarding the separation process, first the bottle is sent to a separation machine. A bottle is separated into two pieces, top pieces (head) and bottom piece (tumbler) 40. Separation is done by creating a fracture (score) line (defining the future rim 10) at the desired height at which separation is to occur. The region around the fracture (score) line is then heated (using a hydrogen gas flame) and thereafter suddenly cooled to induce thermal shock and separates the bottle into the two components, the head and the bottom piece.

It is noted that separation can also be achieved using a diamond saw or other cutting medium known to those of skill in the art.

The tumbler exits the separation machine at this stage and is conveyed to the tumbler-grinding machine. The head remains in the separation machine and is advanced to the grinding section. In the grinding section the head's rim 10 is ground (using scintered diamond discs, or any other grinding medium) and beveled to ensure even and smooth flame polishing on the edge melter machine. At this point the head exits the separation machine and is conveyed to the edge melter.

In the edge melter machine, the rim 10 is flame polished on the edge melter using natural gas and compressed air. First, the unit is preheated to avoid cracking from thermal shock. Once heated, the intensity of the flames is concentrated on the rim to bring it to fiber softening point so that it melts and attains a smooth and even finish. The head is loaded into the flaring machine.

In the flaring machine, the unit is loaded with the neck 30 and mouth 20 of the original bottle pointing downward. The mouth 20 is then preheated to allow the subsequent application of high intensity flames to be directed at the neck 30 and mouth 20. Once preheated the neck is heated, while rotating at a speed of 250-450 rpm, depending on the bottle size and weight, to initiate the flaring of the mouth 20 and neck 30, which will form the foot of the finished goblet. Once the neck is flared to form a proportionate goblet foot, the flames are redirected to the neck 30. Heating this area will soften the stem. The newly formed foot is allowed to rest on a base (flat surface). A graphite-profiled rod (not shown) is inserted below to rest inside the foot to prevent collapse of the neck. While rotating at less than 100 rpm, the friction of the foot on the base will reach a point where the neck 30 will start twisting. This twisting action serves to close of the neck. After twisting, the base is dropped to allow the neck 30 to stretch (allowed to sag) to remove all sharp fold lines created during the twisting of the stem. The graphite rod ensures that the neck 30, that is being drawn out, does not collapse onto the base. The heat is then removed to allow the neck and mouth temperature to lower below the softening point. Once below the softening point, the goblet is loaded in to the annealing lehr.

It is noted that the processing order of the edge melter and flare machines may be changed with same results.

The lehr device is a continuous oven with a graded conveyor belt transporting the product. The purpose is to anneal the product from all stress inducing during the reworking operations, separation, grinding, edge melting and base flaring and twisting in the neck of the goblet. Raising the temperature of the product above annealing point and then lowering the temperature without subjecting the product to thermal shock achieves this. The product delivered at the end of the lehr is finished and ready for decoration and/or shipment. The lehr is also used to melt the low temperature solder glass to seal any aperture that may still remain in the twisted neck.

To anneal the newly-created flare goblet it is not necessary to use specifically an annealing lehr, for example, any batch kiln will likely be sufficient as understood by those of skill in the art. The object is to cool the goblet down at a controlled rate to avoid cracking (thermal shock).

After the goblet is annealed, another alternative to sealing the neck aperture is to apply a (UV curable) non-toxic adhesive.

While the foregoing invention has been shown and described with reference to preferred embodiments and method steps, it will be understood that various changes in form and detail may be made therein without departing from the spirit and scope of this invention.

The invention claimed is:

1. A method of forming a goblet from a glass bottle having a base, a body portion extending from the base and converging towards a neck which terminates in a mouth, the method comprising the steps of:
    severing the base to form a severed base from the body portion along at least a first severance plane which is proximate the base to thereby form a rim integral with said mouth;
    flaring the mouth to form a flared foot from said body portion; and
    sealing a portion of said neck by twisting said neck under heat and rotation to define a closed and sealed area within said body portion between said flared foot and said rim,
    wherein said steps of flaring and sealing are performed on said body portion which is a one-piece construction.

2. A method according to claim 1, wherein said step of flaring includes heating the mouth while the body portion is spun.

3. A method according to claim 2, wherein said mouth will, under centrifugal force, flare outwards when the mouth reaches its fiber softening point.

4. A method according to claim 1, further including the step of removing a waste portion of the rim along the first severance plane.

5. A method according to claim 1, wherein the base is severed from the body by forming a score line around the outer periphery of the body, and subjecting the score line to a thermal shock in the form of a temperature differential so as to cause the body to crack along the score line.

6. A method according to claim 5, in which the temperature differential is applied by heating the body in the region of the score line using a flame or a hot fluid, and subsequently cooling the body using a relatively cold fluid.

7. A method according to claim 1 in which an abrasive saw is used to sever the base from the body.

8. A method according to claim 1, further comprising an annealing process to remove residual stress from said body portion.

9. A method according to claim 1 in which the rim is subsequently polished using at least one of an abrasive belt or disc, a polishing paste, a flame or a laser.

* * * * *